United States Patent [19]

Shinozaki et al.

[11] Patent Number: 5,778,303
[45] Date of Patent: Jul. 7, 1998

[54] MULTIPLEXED AUDIO-VIDEO SIGNAL TRANSMISSION SYSTEM THROUGH PAIR-WIRE

[75] Inventors: Noboru Shinozaki; Seiichi Kubo, both of Osaka, Japan

[73] Assignee: Matsushita Electric Industrial Co., Inc., Osaka-fu, Japan

[21] Appl. No.: 227,341

[22] Filed: Apr. 14, 1994

[30] Foreign Application Priority Data

Apr. 16, 1993 [JP] Japan ................................. 5-090289
Oct. 8, 1993 [JP] Japan ................................. 5-253260

[51] Int. Cl.[6] .......................... H04N 1/00; H04N 7/14; H03F 3/26; H03H 5/00
[52] U.S. Cl. ........................ 455/5.1; 348/14; 348/16; 330/275; 330/301; 330/116; 333/25
[58] Field of Search .................. 348/12, 13, 14, 348/15, 16, 143; 455/5.1, 6.1, 6.3; 330/250, 262, 275, 301, 116; 333/25

[56] References Cited

U.S. PATENT DOCUMENTS

| | | | |
|---|---|---|---|
| 4,005,399 | 1/1977 | Pazemenas | 340/310.01 |
| 4,054,908 | 10/1977 | Poirier et al. | 348/15 |
| 4,229,625 | 10/1980 | Derby et al. | 179/170 R |
| 4,471,317 | 9/1984 | Nilsson et al. | 330/141 |
| 4,823,093 | 4/1989 | Frey | 330/254 |
| 4,954,886 | 9/1990 | Elberbaum | 348/143 |
| 4,955,048 | 9/1990 | Iwamura et al. | 379/53 |
| 5,032,820 | 7/1991 | Tanikawa et al. | 340/310 R |
| 5,109,391 | 4/1992 | Kurobe | 375/17 |
| 5,132,609 | 7/1992 | Nguyen | 324/130 |
| 5,165,017 | 11/1992 | Eddington et al. | 381/68.4 |
| 5,347,305 | 9/1994 | Bush et al. | 348/14 |
| 5,397,947 | 3/1995 | Craft | 327/104 |

FOREIGN PATENT DOCUMENTS

| | | |
|---|---|---|
| 2-13031 | 1/1990 | Japan . |
| 2168737 | 6/1990 | Japan . |
| 4113792 | 4/1992 | Japan . |
| 2225195 | 5/1990 | United Kingdom ........... H04N 11/00 |

OTHER PUBLICATIONS

IEEE Transactions on Consumer Electronics, vol. CE-33, No. 4, Nov. 1987, pp. 557-564, by Iwamura et al. entitled "Door Phone Camera Transmission System Using Simple PVC Pair Cable".
European Search Report and Annex.
English Language Abstract of Japanese Patent No. 4-113792.
English Language Abstract of Japanese Patent No. 2-168737.
English Language Abstract of Japanese Patent No. 2-13031.

*Primary Examiner*—John K. Peng
*Assistant Examiner*—John W. Miller
*Attorney, Agent, or Firm*—Greenblum & Bernstein P.L.C.

[57] ABSTRACT

A multiplexed audio-video signal transmission system has a camera-equipped intercom which produces a balanced audio-video signal. A twisted pair-wire connected to the intercom transmits a multiplexed signal of audio signal, video signal modulated to a frequency band not overlapping the audio signal frequency, and DC power. The audio signal and video signal are carried in the pair-wire in opposite phase in a balanced condition, and the DC power is carried between the pair-wire. A relay device is inserted in the pair-wire to refine the video signal. Main line branching device and door branching device are provided to branch out the multiplexed signal to a television equipped control unit 17.

22 Claims, 13 Drawing Sheets

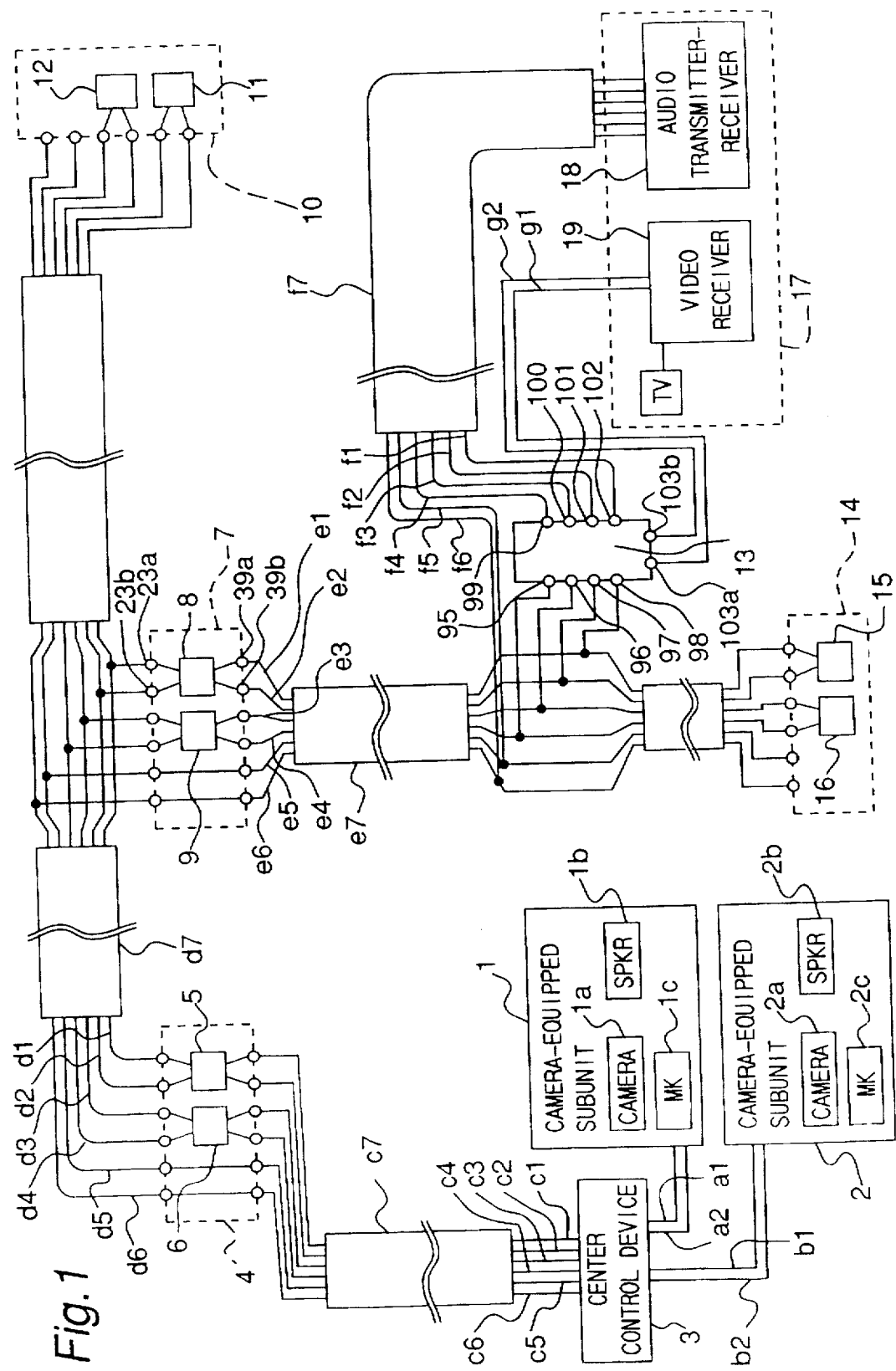

MULTIPLEXED AUDIO-VIDEO SIGNAL TRANSMISSION SYSTEM THROUGH PAIR-WIRE

BACKGROUND OF THE INVENTION

1. Field of the Invention

The present invention relates to a multiplexed audio-video transmission system through a pair-wire, such as used for connecting telephones, and using a main line branching device and to a branch line branching device enabling multiplex transmission of video signals and audio signals through the pair-wire, thereby enabling a point-to-multipoint connection model. This type of system is typically used in security systems using the pair-wire to provide two-way audio and one-way video viewing.

2. Description of the Prior Art

FIG. 10 shows a prior art audio-video transmission system such as applied in an audio-video security system.

The audio-video security system comprises a camera-equipped audio terminal 201 and a television-equipped audio terminal 217. The camera-equipped audio terminal 201, of which the exterior camera-equipped intercom unit, or interphone unit, is typical, transmits the multiplexed audio signal, DC current and video signal, which is modulated to a frequency band not overlapping the audio signal frequency band. The television-equipped audio terminal 217, of which the interior television-equipped intercom unit is typical, comprises an audio transmitter 215 for supplying DC current and receiving and transmitting the audio signal, and a video receiver 216 for receiving the video signal. The camera-equipped audio terminal 201 and television-equipped audio terminal 217 are connected by means of a specific wire pair 202a, 202b in the main line paired cable comprising plural wire pairs, a specific wire pair 207a, 207b in the branch line paired cable comprising plural wire pairs, the dedicated audio signal transmission cable 213a, 213b, and the dedicated video signal transmission cable 214a, 214b (in FIG. 10, only one pair each of the main and branch line paired cables is shown).

The main line wire pair 202a, 202b and the branch line wire pair 207a, 207b are connected by the main line branching device 205; the branch line wire pair 207a, 207b, audio signal transmission wires 213a, 213b, and video signal transmission wires 214a, 214b are connected by the branch line branching device 210. A main line terminator 204 is provided at the end of the main line wire pair 202a, 202b for the impedance matching of the main line wire pair 202a, 202b in the video signal frequency band and having a high impedance characteristic at frequencies lower than the video signal frequency band. A branch line terminator 208 is provided at the end of branch line wire pair 207a, 207b for the impedance matching of the branch line wire pair 207a, 207b in the video signal frequency band and having a high impedance characteristic at frequencies lower than the video signal frequency band.

The main line branching device 205 is connected at an appropriate position in the main line wire pair 202a, 202b and in turn to the branch line wire pair 207a, 207b. When the audio signal is passed to the branch line wire pair 207a, 207b, DC current is input from terminals 203a, 203b, the video signal is received balanced at a high input impedance from terminals 203a, 203b, and is output balanced to terminals 206a, 206b at an output impedance matched with the branch line wire pair 207a, 207b at the frequency band of the video signal.

The branch line branching device 210 is connected at an appropriate position in the branch line wire pair 207a, 207b, one end of the audio signal transmission wires 213a, 213b, and one end of the video signal transmission wires 214a, 214b. DC current is supplied from the terminals 211a and 211b. The audio signal is transmitted bidirectionally between terminals 209a, 209b and terminals 211a, 211b. The video signal is received at a high input impedance balanced from terminals 209a, 209b, and is output unbalanced to terminals 212a, 212b at an output impedance matched with the video signal transmission wires 214a, 214b at the frequency band of the video signal.

The main line branching device 205 and branch line branching device 210 of the prior art audio-video transmission system as above typically use a transformer.

FIG. 11 is a circuit diagram of a conventional transformer-type main line branching device. This transformer-type main line branching device 205 comprises a balanced transmitter 273 for transmitting the video signal, and a low band signal mixer 274 for transmitting the audio signal.

At the one balanced transmitter 273, the video signal input to terminals 203a and 203b passes capacitors 276a, 276b, is applied at a high input impedance with respect to the characteristic impedence of the specific pair-wire, to terminals 203a and 203b, supplied to the input-side coil of the transformer 277, of which the output impedance characteristic is matched to the characteristic impedance of the specific pair of wires used in the branch line cable, and is thus output from the output-side coil of the transformer 277 through capacitors 278a, 278b to terminals 206a and 206b.

Note that passage of the audio signal and DC current is blocked at this time by capacitors 276a, 276b and capacitors 278a, 278b.

At the low band signal mixer 274, the audio signal is input through capacitors 280a, 280b and coils 281a, 281b, enabling bidirectional transmission between terminals 203a, 203b and terminals 206a and 206b. Coils 281a, 281b block passage of the video signal at this time, and capacitors 280a, 280b block passage of the DC current.

FIG. 12 is a circuit diagram of a prior art transformer-type door branching device 210. This transformer type door branching device 210 comprises an unbalanced transmitter 284 for transmitting the video signal and balanced-to-unbalanced conversion, and a low band signal separator 283 for transmitting the audio signal.

At the unbalanced transmitter 284, the video signal input balanced to terminals 209a, 209b is applied to capacitors 289a, 289b and at a high input impedance to terminals 212a, 212b, passes transformer 290, of which the output impedance characteristic is matched to the characteristic impedance of the video signal transmission cable (of which coaxial cable is typical), and is output unbalanced from the transformer 290 to terminals 212a, 212b. The audio signal and DC current are blocked by capacitors 289a, 289b at this time.

At the low band signal separator 283, the audio signal is input through coils 286a, 286b and capacitors 287a, 287b to enable bidirectional transmission between terminals 209a, 209b and terminals 211a, 211b. The video signal is blocked by coils 286a, 286b, and the DC current is blocked by capacitors 287a, 287b at this time.

With the prior art transformer-type main line branching devices and branch line branching devices, however, it is necessary to use transformers 277 and 290 with a uniform high input impedance at the video signal frequency band, and manufacturing such transformers is technically difficult. This makes it necessary to use transformers with a nonuniform high input impedance in the video signal frequency band, resulting in deterioration of video signal transmission quality.

The transmitted signal level also tends to drop when the video signal is passed because the number of turns in the input-side coil of the transformer is significantly greater than the number of turns in the output-side coil.

In addition, the high cost of the transformers necessarily increases the cost of the overall system, while practical limits to reducing transformer size limit the size and weight reductions that can be achieved in the individual units.

SUMMARY OF THE INVENTION

Therefore, an object of the present invention is to provide a transformer-less multiplexed audio-video signal transmission system so that a uniform high input impedance characteristic can be assured in the video signal frequency band; dropping of the signal transmission level when the video signal is passed can be prevented; cost increases in the overall system can be reduced; and unit size and weight can be reduced.

Another object of the present invention is to provide a transformer-less multiplexed audio-video signal transmission system for transmitting through a pair-wire a multiplexed signal of audio signal, video signal modulated to a frequency band not overlapping the audio signal frequency, and DC current, in which the audio signal and video signal are carried in the pair-wire in opposite phase in a balanced condition, and the DC current is carried between the pair-wire.

To achieve these and other objects, the multiplexed audio-video signal transmission system according to the present invention comprises:

camera-equipped subunit means having a camera, a speaker and a microphone for producing a first balanced audio-video signal;

first pair-wire means connected to the subunit means for transmitting the first balanced audio-video signal;

a relay device connected to the first pair-wire means, the relay device separating a balanced video signal from the first balanced audio-video signal to refine the balanced video signal and combining the refined balanced video signal with a separated audio signal to produce a second balanced audio-video signal, the relay device comprising:

(i) a balanced-to-unbalanced convertor for converting the separated balanced video signal to unbalanced video signal;

(ii) an automatic gain control unit for amplifying the unbalanced video signal; and (iii) a balanced transmitter for producing an amplified balanced video signal which is a refined version of the balanced video signal;

a second pair-wire means connected to the relay device for transmitting the second balanced audio-video signal;

a line branching device connected to the second pair-wire means for receiving and refining the second balanced audio-video signal and for producing a third balanced audio-video signal;

a third pair-wire means connected to the branching device for transmitting the third balanced audio-video signal;

a door branching device connected to the third pair-wire means for receiving the third balanced audio-video signal and for separating the audio signal and the video signal; and a television-equipped control unit connected to the door branching device for viewing an image captured by the camera using the video signal and for effecting two-way conversation with the camera-equipped subunit means using the audio signal.

BRIEF DESCRIPTION OF THE DRAWINGS

The present invention will become more fully understood from the detailed description given below and the accompanying diagrams wherein:

FIG. 1 is a circuit diagram of a multiplexed audio-video transmission system through a pair-wire according to the preferred embodiment of the invention.

FIG. 2b is a graph showing waveforms observed at various points in FIG. 2a.

FIG. 3 is a circuit diagram of a balanced-to-unbalanced convertor show in FIG. 2a.

FIG. 4 is a circuit diagram of an automatic gain control device shown in FIG. 2a.

FIG. 5a is a circuit diagram of a main line branching devices shown in FIG. 2a.

DESCRIPTION OF PREFERRED EMBODIMENTS

Figure 2A:
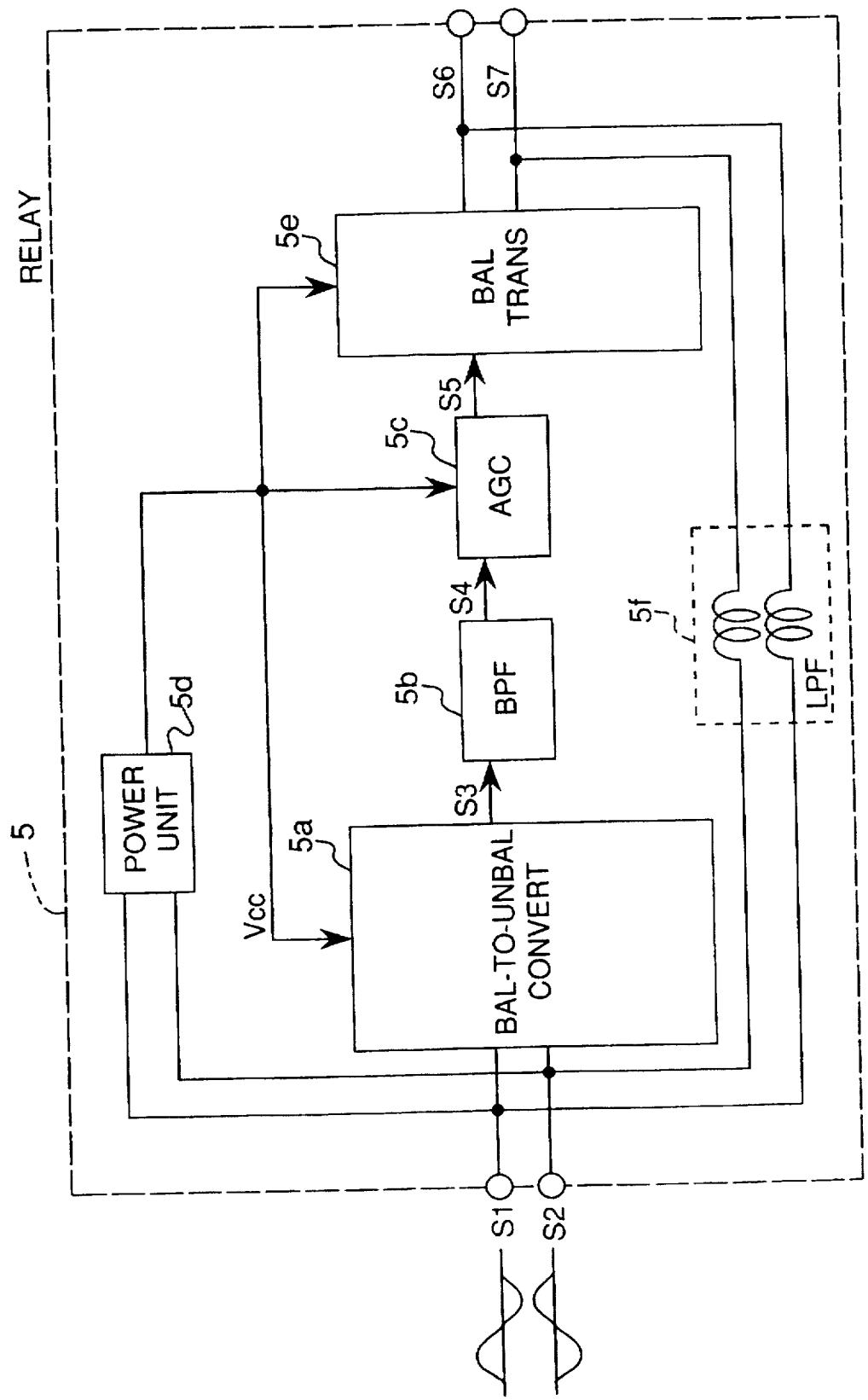
FIG. 2a is a block diagram of a relay used in the circuit of FIG. 1.

The preferred embodiments of the present invention are described below with reference to the accompanying figures, of which FIG. 1 is a circuit diagram showing a multiplexed audio-video signal transmission system through two wires extending parallel and straight or twisted, such as used in a telephone connection. The two parallel wires is herein referred to as a pair-wire. The systems disclosed herein are represented by a camera and monitor-equipped intercom security system.

The multiplexed audio-video signal transmission system shown in FIG. 1 comprises camera-equipped door terminals 1 and 2, a television-equipped intercom terminal 17, and a central processing unit (CPU) 3. The camera-equipped door terminal 1 has a camera 1a, a speaker 1b and a microphone 1c. Similarly camera-equipped door terminal 2 has a camera 2a, a speaker 2b and a microphone 2c.

The camera-equipped door terminals 1 and 2 transmit multiplexed signal of the audio signal, DC current, and video signal. The video signal is preferably frequency modulated to a frequency band not overlapping the audio signal frequency band. The camera-equipped door terminals 1 and 2 may be provided at a front and back entrance doors, respectively, of a building. Each of the camera-equipped door terminals 1 and 2 further has a keyboard (not shown) by which a room number signal is produced by operating the keys to designate a particular room in the building.

The television-equipped intercom terminal 17 comprises an audio transmitter 18 for transmitting and receiving the audio signal, and a video receiver 19 for receiving the video signal and supplying DC current to a television TV and also to branching device 13. The audio transmitter 18 has a CPU which compares the received room number signal with a particular room number signal allocated to that CPU. When the received room number signal matches with the allocated room number signal, that particular television-equipped intercom terminal 17 is activated.

The center control device 3 has a CPU which provides bus control between the camera-equipped door terminals 1, 2 and the television-equipped intercom terminal 17, which can be connected where required to the security system, thus enabling audio and video signal transmission. The center control device 3 is further connected to the one camera-equipped door terminal 1 via wire pair a1, a2, and to the other camera-equipped door terminal 2 via wire pair b1, b2.

The center control device 3 and television-equipped intercom terminal are connected by main lines c7 and d7, branch line e7, dedicated audio signal transmission cable f7, and a dedicated video signal transmission cable, which is a pair of co-axial cables g1 and g2. Main line c7 comprises two pairs of data lines c1, c2 and c3, c4 and one pair of control lines c5 and c6. Main line d7 comprises two pairs of data lines d1, d2 and d3, d4 and one pair of control lines d5 and d6. Branch line e7 similarly comprises two pairs of data lines e1, e2 and e3, e4 and one pair of control lines e5 and e6. The dedicated audio signal transmission cable f7 comprises two pairs of data lines f1, f2 and f3, f4 and one pair of control lines f5 and f6. The data lines, such as c1, c2, are provided for sending data (multiplexed signal of the audio signal, DC current, and video signal) on wire pair a1, a2 or wire pair b1, b2, as selected by the center control device 3. The control lines, such as c5, c6, are provided for sending control signal, such as a room number signal produced by the keyboard in the camera-equipped door terminal 1 or 2.

The data transmitted through data lines, such as c1, c2, are completely in opposite phase, such as shown at inputs S1 and S2 in FIG. 2a. Such a signal in opposite phase is referred to as a balanced signal.

The two pairs of data lines c1, c2 and c3, c4 and one pair of control lines c5 and c6 in main line c7, and the two pairs of data lines d1, d2 and d3, d4 and one pair of control lines d5 and d6 in main line d7 are connected through relay 4. The two pairs of data lines d1, d2 and d3, d4 and one pair of control lines d5 and d6 in main line d7 are connected through main line branching device 7 with the two pairs of data lines e1, e2 and e3, e4 and one pair of control lines e5 and e6 in branch line e7.

The two pairs of data lines e1 e2 and e3, e4 in branch line e7 are connected with the two pairs of data lines f1, f2 and f3, f4 in the dedicated audio signal transmission cable f7 and with the dedicated video signal transmission coaxial cables g1 and g2 through the door branching device 13. The control lines e5 and e6 in branch line e7 are connected directly to the control lines f5 and f6 in the dedicated audio signal transmission cable f7.

The ends of the two pairs of data lines d1, d2 and d3, d4 in main line d7 are connected to a main line terminator 10, which matches the characteristic impedance of the data lines d1, d2 and d3, d4 in the video signal frequency band and has a high impedance characteristic at frequencies lower than the video signal frequency band so as to prevent any echo reflection of the audio-video signal at the terminator 10. For the same purpose, the ends of the two pairs of data lines e1, e2 and e3, e4 in branch line e7 are connected to a branch line terminator 14, which matches the characteristic impedance of the data lines e1, e2 and e3, e4 in the video signal frequency band and has a high impedance characteristic at frequencies lower than the video signal frequency band.

The relay 4 is placed at any suitable relay position between main line c7 and main line d7 to enable bidirectional transmission of the audio signal and DC current between the main lines c7 and d7; particularly between two pairs of data lines c1, c2 and c3, c4 in main line c7 and the two pairs of data lines d1, d2 and d3, d4 in main line d7. DC current is received from the two pairs of data lines c1, c2 and c3, c4 in main line c7.

The relay 4 comprises relay devices 5 and 6 for receiving the balanced signal. In each of the relay devices 5 and 6, the balanced signal is converted to unbalanced signal, which is a signal between a ground level and the video signal. The characteristic impedance of the two pairs of data lines c1, c2 and c3, c4 in main line c7 match with the input impedance of the respective relay devices 5 and 6. In each of the relay devices 5 and 6, the video signal is amplified to the rated transmission signal level. The unbalanced is again converted to the balanced signal in each of the relay devices 5 and 6, and the balanced signal is transmitted to the two pairs of data lines d1, d2 and d3, d4 in main line d7. Here again, the impedance matching is taken between the outputs of the devices 5 and 6 and the two pairs of data lines d1, d2 and d3, d4 in main line d7 in the video signal frequency band. The control lines c5 and c6 of main line c7 are directly connected with the control lines d5 and d6 of main line d7.

The main line branching device 7 is placed between the one end of the branch line e7 and any suitable position in main line d7 to enable bidirectional transmission of the audio signal between the two pairs of data lines d1, d2 or d3, d4 in main line d7 and the two pairs of data lines e1, e2 or e3, e4 in branch line e7. DC current is also transmitted.

The main line branching unit 7 comprises main line branching devices 8 and 9 for receiving balanced signal of the video signal from the two pairs of data lines d1, d2 and d3, d4 in main line d7 at a high input impedance level, and for transmitting balanced signal along the two pairs of data lines e1, e2 and e3, e4 in branch line e7. Again, the impedance matchings at the video signal frequency band are taken at the input and output of the main line branching devices 8 and 9. The control lines d5 and d6 of main line d7 are directly connected to the control lines e5 and e6 of the branch line e7.

The door branching device 13 is connected at an appropriate position in the branch line e7 between the end of the dedicated audio signal transmission cable f7 and the ends of the dedicated video signal transmission cables g1, g2, which are provided to a particular room. DC current is supplied from the dedicated video signal transmission cables g1, g2. The door branching device 13 enables bidirectional transmission between the data lines e1–e4 in branch line e7 and the data lines f1–f4 of the dedicated audio signal transmission cable f7; receives the video signal balanced at a high input impedance level from the data lines e1–e4 in branch line e7; detects a DC short-circuited state from the two data line pairs f1, f2 and f3, f4 of the dedicated audio signal transmission cable f7; and transmits unbalanced signal of the video signal taken from one line pair that has been is detected as short-circuited, through the video signal transmission cables g1, g2. The impedance matching in the video signal frequency band is taken at each of input and output of the door branching device 13. The control lines e5 and e6 of the branch line e7 are directly connected to the control lines f5 and f6 of the dedicated audio signal. transmission cable f7.

The preferred embodiment of the relay device 5 is, described next with reference to FIGS. 1–4.

FIG. 2a is a block diagram of the relay device 5 provided in the relay 4. The relay device 6 has the same structure as the relay device 5. Input terminals S1 and S2 are connected to the either one of the two pairs of data lines c1, c2 and c3, c4 in main line c7, and output terminals S6 and S7 are connected to either one of the two pairs of data lines d1, d2 and d3, d4 in main line d7. The relay device 5 has a balanced-to-unbalanced convertor 5a, a band pass filter 5b, an automatic gain control device 5c, a balanced signal transmitter 5e, a low pass filter 5f, and a power unit 5d.

Figure 2B:
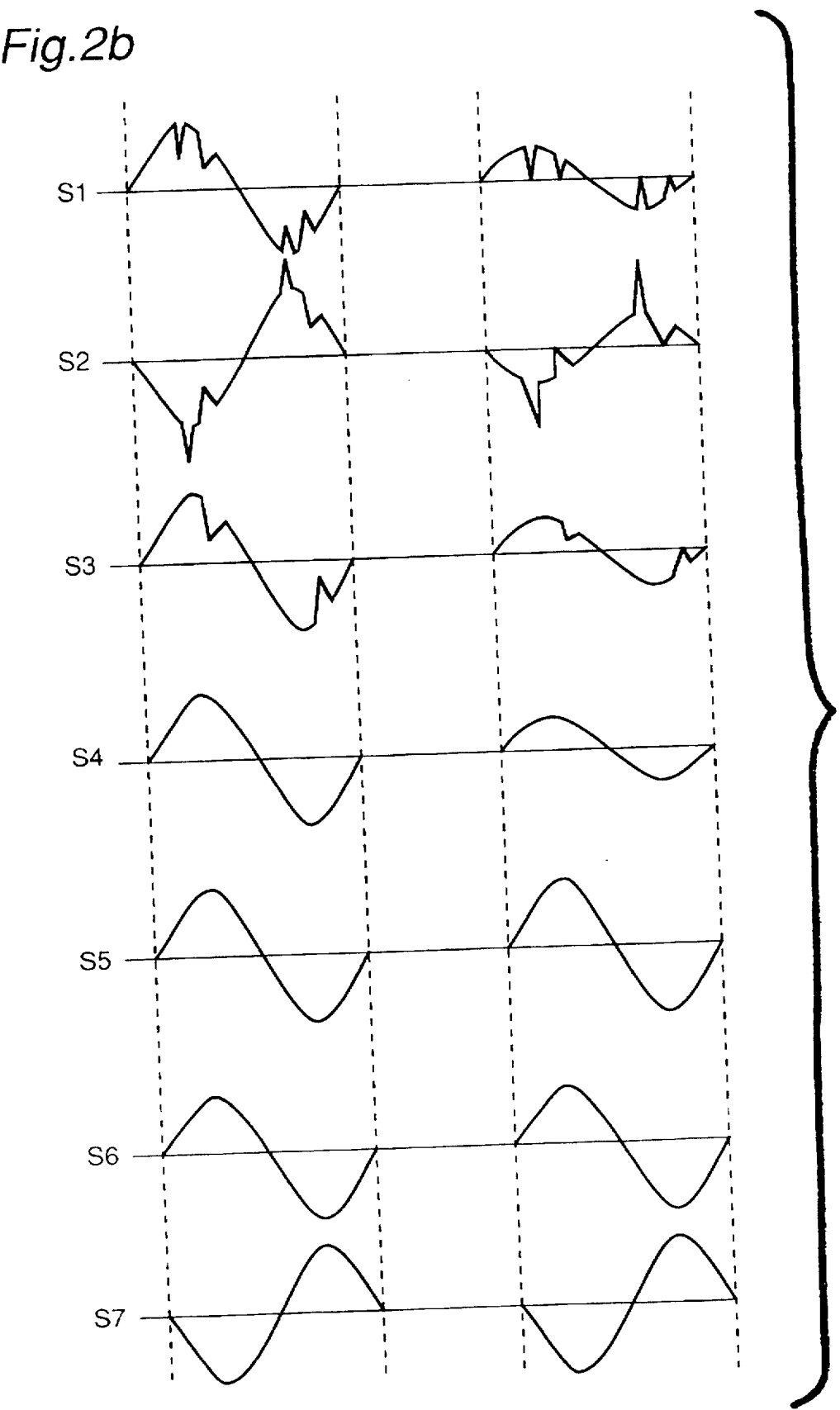

FIG. 2b shows waveforms of the signals at inputs and outputs of the circuits 5a, 5b, 5c and 5e. In FIG. 2b, the waveforms in the left-hand column show a case when the input balanced signals S1 and S2 have a relatively high amplitude, and those in the right-hand column show a case when the input balanced signals S1 and S2 have a relatively low amplitude.

The balanced-to-unbalanced convertor 5a takes impedance matching at the video signal frequency band at its input with the data lines c1, c2; presents a high input impedance in the audio signal and DC current frequency band so as to block the audio signal and DC current; receives a balanced video signal (S1 and S2 in FIG. 2b), converts the balanced signal to an unbalanced video signal (S3 in FIG. 2b), and transmits the unbalanced signal.

The automatic gain control device 5c amplifies the video signal output (S4 in FIG. 2b) produced from the band pass filter 5b to produce an unbalanced signal having an appropriate amplitude.

The balanced transmitter 5e converts the video signal obtained from the automatic gain control device 5c from the unbalanced signal format to balanced signal format; takes impedance matching in the video signal frequency band with the data lines d1, d2 in main line d7; and presents a high output impedance in the audio signal and DC current signal frequency band while transmitting the video signal.

The low pass filter unit 5f has two coils with a high impedance characteristic in the video signal frequency band and a low impedance characteristic in the audio signal frequency band, so that audio signal can be transmitted therethrough in bidirection.

The power unit 5d is provided for supplying DC current at a high input impedance in the video signal and audio signal frequency bands and converts the input current to the predetermined voltage level to supply power to the balanced-to-unbalanced convertor 5a, automatic gain control device 5c, and the balanced transmitter 5e.

Figure 3:
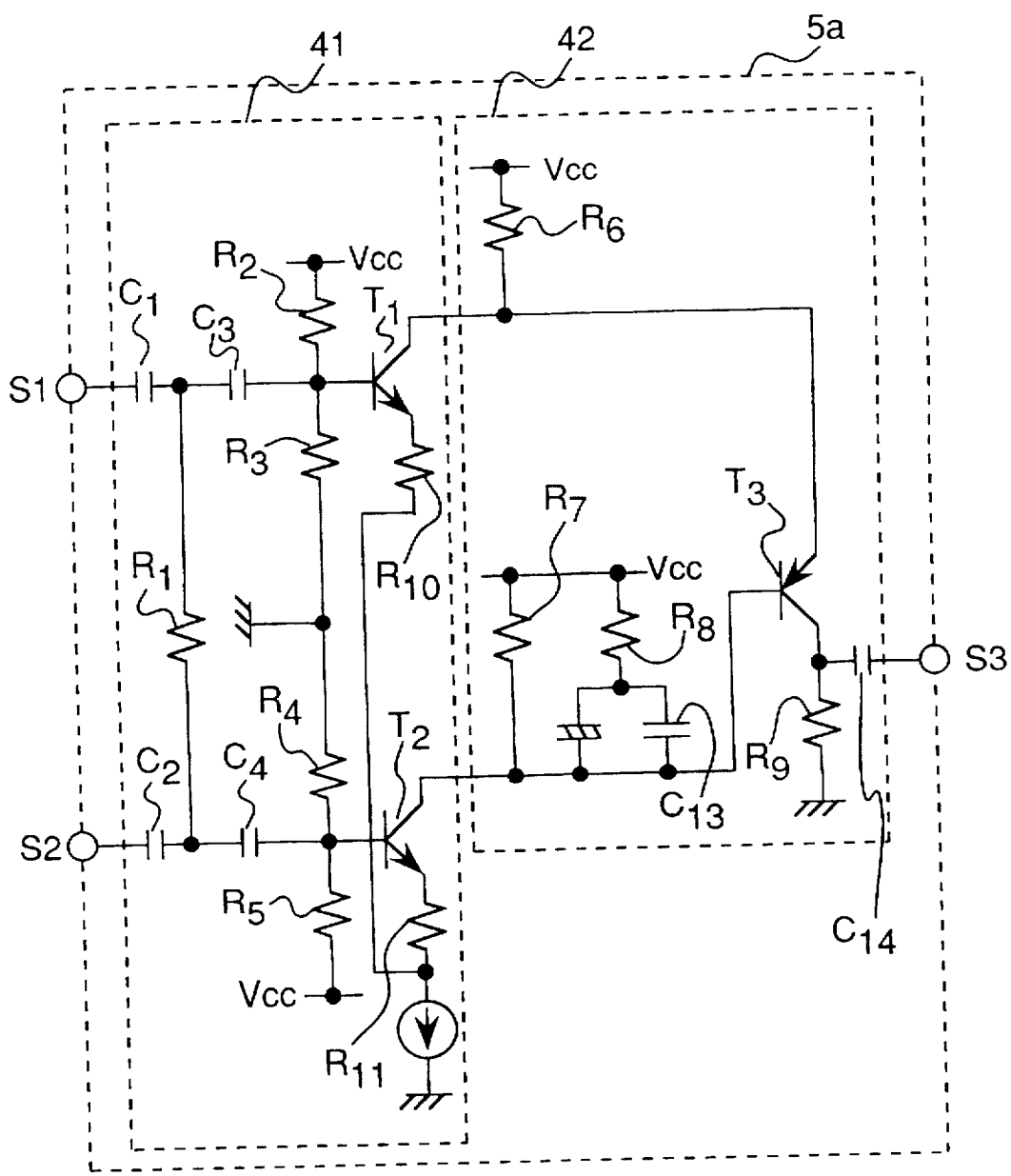

Referring to FIG. 3, a detail of the balanced-to-unbalanced convertor 5a is shown. The balanced-to-unbalanced convertor 5a has a balanced receiver 41 formed by a differential circuit and an unbalanced transmitter 42.

The balanced receiver 41 comprises capacitors C1 and C2 and resistor R1, which are for the impedance matching with respect to the lines c1 and c2. The balanced receiver 41 further comprises transistors T1 and T2 with capacitors C3, C4 and bias resistors R2, R3 and R4, R5 connected to the bases of the transistors T1 and T2. Also, resistors R10 and R11 are connected to the emitters of the transistors T1 and T2. The capacitors C3, C4 have a high impedance with respect to the audio signal frequency band. The bias resistors 35, 36 and 37, 38 are for matching the characteristic impedance of the input lines.

The unbalanced transmitter 42 comprises a transistor T3 with its emitter and base connected to the collectors of transistors T1 and T2, respectively. The unbalanced transmitter 42 further comprises resistors R6, R7, R8 and R9 and a capacitor C13. The resistances of resistor R6 is smaller than is that of resistor R7 so that the base and emitter voltage of the transistor T3 is made approximately equal in terms of DC level. Resistor R8 and capacitor C13 are provided for the impedance matching. The transistor T3 operates such that the signals appearing at its base and emitter are transmitted to the collector thereof when said signals have opposite phase, but are cut off when said signals have the same phase. In this manner, the balanced video signal, which is a pair of opposite phase signals, is converted to unbalanced video signal.

By the balanced-to-unbalanced convertor Sa of the embodiment thus configured, a uniform input impedance is held in the video signal frequency band by means of the bias resistances R2–R5 provided in the balanced receiver 41, and can thus avoid, during video signal transmission, deterioration of transmission quality such as caused by the phase distortion. In the case where a transformer is used in the balanced-to-unbalanced convertor as in the prior art, the phase distortion would occur often, and it is difficult to remove such a phase distortion.

It is also possible to avoid deterioration of audio signal transmission quality due to a loss of AC impedance because the capacitors C3 and C4 can hold a high AC impedance level between terminals S1 and S2 in the audio signal frequency band.

Figure 4:
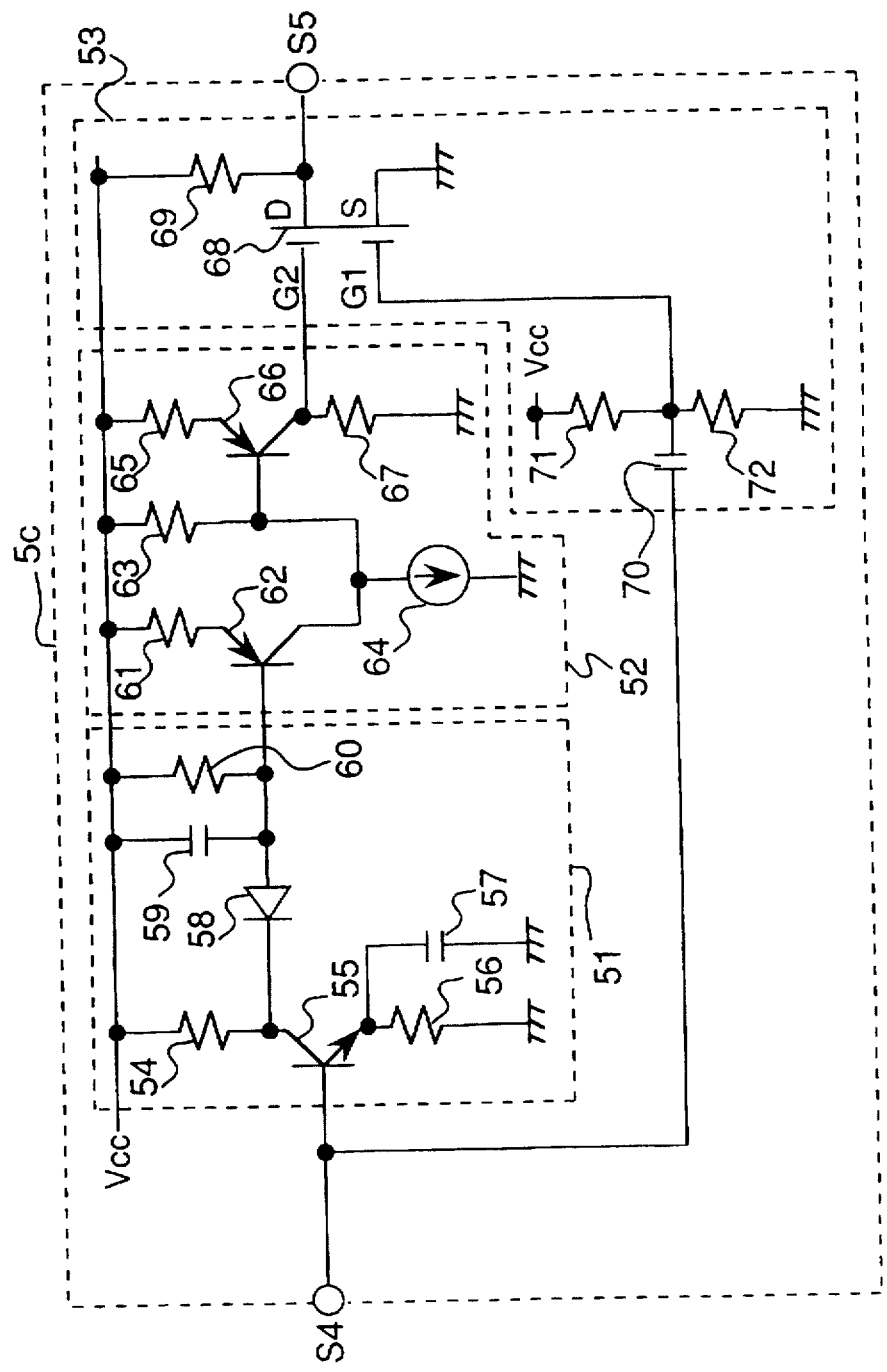

Referring to FIG. 4, a detail of the automatic gain control device 5c is shown. Terminal S4 is connected to the band pass filter 5b, terminal S5 is connected to the balanced transmitter 5e. The automatic gain control device 5c has a half-wave rectification circuit 51, a differential amplifier 52, and an amplification adjustment circuit 53.

The half-wave rectification circuit 51 comprises a transistor 55 with the terminal S4 connected to the base, the emitter connected to an emitter resistor 56 connected in parallel with a capacitor 57, and the collector connected to resistor 54. A diode 58 is provided with its cathode connected to the transistor 55 collector and the anode connected to parallel-connected pull-up resistor 60 and capacitor 59. The video signal input from the terminal S4 is half-wave rectified and smoothed by the half-wave rectification circuit 51, obtaining a high DC voltage equivalent to the attenuated signal level of the video signal.

The differential amplifier 52 has a transistor 62 with an emitter resistor 61 and its base connected to the anode of the diode 58. A constant current supply 64 is connected to the collector of the transistor 62 and one side of the pull-up resistor 63. A transistor 66 is provided with an emitter resistor 65, a collector resistor 67, and its base connected to the collector of transistor 62. A DC voltage differentially amplified by the differential amplifier 52 is obtained from DC voltage output by the half-wave rectification circuit 51, and the current supplied to the pull-up resistor 63 is amplified an amount equivalent to the increase in the DC voltage input to the transistor 62 to amplify the DC voltage of the collector resistor 67.

The amplification adjustment circuit 53 has a four-terminal FET 68 with gate G1 connected to terminal 84 through capacitor 70 and bias resistors 71 and 72, and gate G2 connected to the collector of transistor 66 in the differential amplifier 52. The drain of FET 68 is connected to a drain resistor 69 and also to terminal S5. The video signal input to gate G1 of the FET 68 from the terminal S4 is amplified an amount equivalent to the DC voltage level obtained by the differential amplifier 52 and input to gate G2. and is output from terminal S5.

The automatic gain control device 5c simplifies half-wave rectification and smoothing operation particularly by the use of diode 58 and the parallel-connected pull-up resistor 60 and capacitor 59.

Setting the degree of amplification and the offset voltage adjustment is also simplified by the use of the pull-up resistor 63 in the operating circuit, and adjusting the voltage input to gate G2 by adjusting the ratio of the emitter resistance to the collector resistance of the transistor 66.

Note that the relay 4 can be provided in plural as required in the main line for transmitting the audio signal, video signal, and DC current.

Figure 5A:
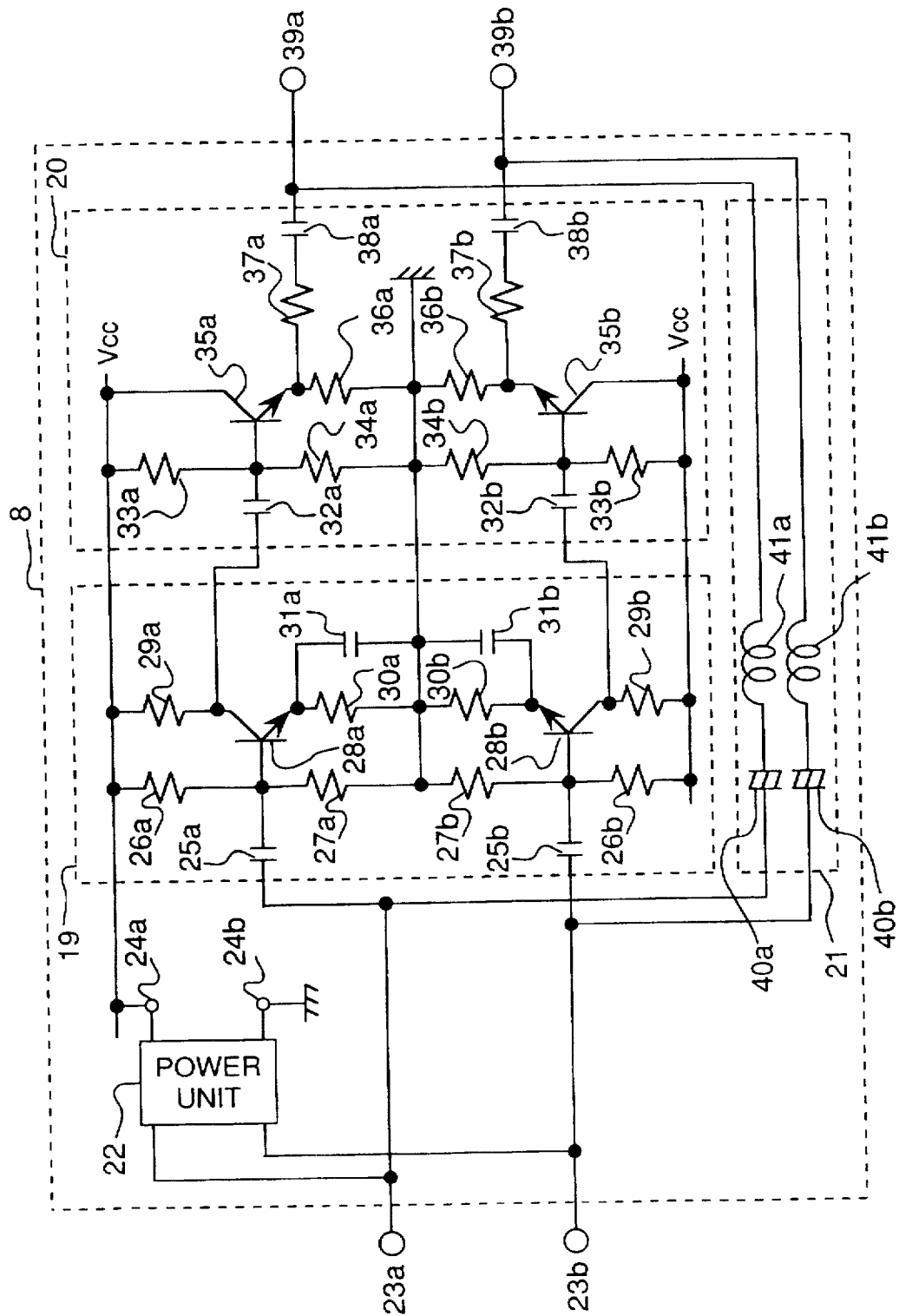

Referring to FIG. 5a, the transformer-less line branching device 8 comprises a balanced receiver 19, a balanced transmitter 20, a low band signal mixer 21, and a power supply unit 22. The line branching device 8 receives the balanced signal and sends out a refined version of the balanced signal.

The balanced receiver 19 receives, at a high input impedance, the balanced video signal from one pair-wire, such as d1, d2, in the main line d7. The balanced transmitter 20 matches the video signal impedance to the characteristic impedance of the branch lines and transmits the signals balanced. The low band signal mixer 21 is provided for the bidirectional transmission of the audio signal. The power supply unit 22 converts the DC current supplied from the main line d1, d2 to a DC voltage, and supplies this DC voltage to the balanced receiver 19 and balanced transmitter 20.

The balanced receiver 19 comprises bias resistors 26a, 27a, 26b, and 27b; capacitors 25a and 25b; parallel-connected source resistors 30a and amplification capacitor 31a; parallel-connected transistor 28a, to which collector resistor 29a is connected, emitter resistor 30b, and amplification capacitor 31b; and transistor 28b, to which collector resistor 29b is connected. The base resistors 26a, 27a, 26b, and 27b maintain an impedance level sufficiently greater than the characteristic impedance of the one wire pair d1, d2 in the main line in the video signal frequency band, and the capacitors 25a and 25b pass the video signal frequency band.

The balanced transmitter 20 comprises transistors 35a and 35b; capacitor 32a and bias resistors 33a, 34a connected to the base of transistor 35a; capacitor 32b and bias resistors 33b, 34b connected to the base of transistor 35b; matching resistor 37a and capacitor 38a connected between the emitter of transistor 35a and terminal 39a; matching resistor 37b and capacitor 38b connected between the emitter of transistor 35b and terminal 39b; emitter resistor 36a connected to the emitter of transistor 35a; and emitter resistor 36b connected to the emitter of transistor 35b.

Matching resistor 37a matches the characteristic impedance of the branch line connected to terminals 39a, and capacitor 38a passes the video signal. Matching resistor 37b matches the characteristic impedance of the branch line connected to terminal 39b, and capacitor 38b passes the video signal. The balanced video signals from terminals 39a and 39b are in complete opposite phase.

The balanced transmitter 20 matches the video signal output balanced by the balanced receiver 19 to the characteristic impedance of the branch line connected to terminals 39a and 39b, and thus balance-transmission of the video signal is enabled.

The low band signal mixer 21 comprises capacitor 40a and coil 41a connected between terminals 23a and 39a, and capacitor 40b and coil 41b connected between terminals 23b and 39b. Capacitors 40a and 40b pass the audio signal, and coils 41a and 41b pass the audio signal while blocking the video signal, thus enabling bidirectional transmission of the audio signal between terminals 23a, 23b and terminals 39a, 39b, respectively. Note that the capacitors 40a and 40b and coils 41a and 41b are referred to as electronic components.

The operation of this transformer-less main line branching device 8 is described next.

First, a uniform high input impedance is maintained at the video signal frequency band by the bias resistors 26a, 27a, 26b, and 27b provided in the balanced receiver 19, thereby making it possible to avoid deterioration of transmission quality (of which phase distortion, which is difficult to manage with a transformer, is typical) during video signal transmission.

By using capacitors that are designed to maintain the level of the received video signal input to terminals 23a, 23b equal to the level of the transmitted video signal output from terminals 39a, 39b as the amplification capacitors 31a, 31b provided in the balanced receiver 19, it is also possible to avoid deterioration of the transmission signal level caused by differences in the turns ratios of the input- and output-side transformer coils.

It is also possible to maintain a high AC impedance between terminals 23a, 23b and terminals 39a, 39b, respectively, in the audio signal frequency band by means of capacitors 25a, 25b and capacitors 38a, 38b, and thus avoid deterioration of audio signal transmission quality caused by reduced AC impedance.

It is to be noted that plural transformer-less main line branching devices 8 can be inserted at the desired locations to one wire pair in the main line carrying the audio signal, video signal, and DC current.

Figure 5B:
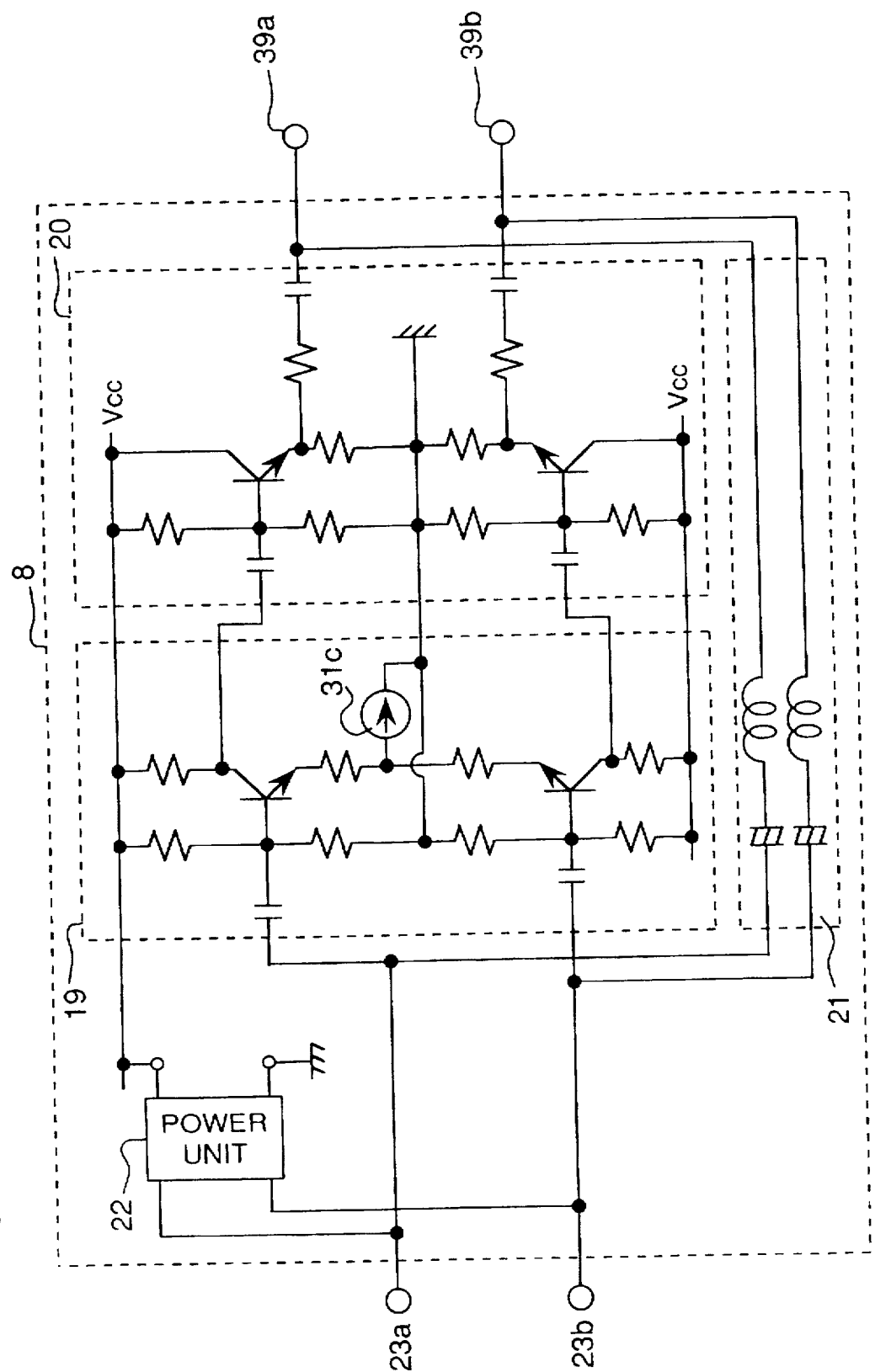
FIG. 5b is a view similar to FIG. 5a, but showing a modification thereof.

Referring to FIG. 5b, a modification of the transformer-less line branching device 8 is shown. In the balanced receiver 19, instead of capacitors 31a and 31b, a constant current source 31c can be used.

Figure 6:
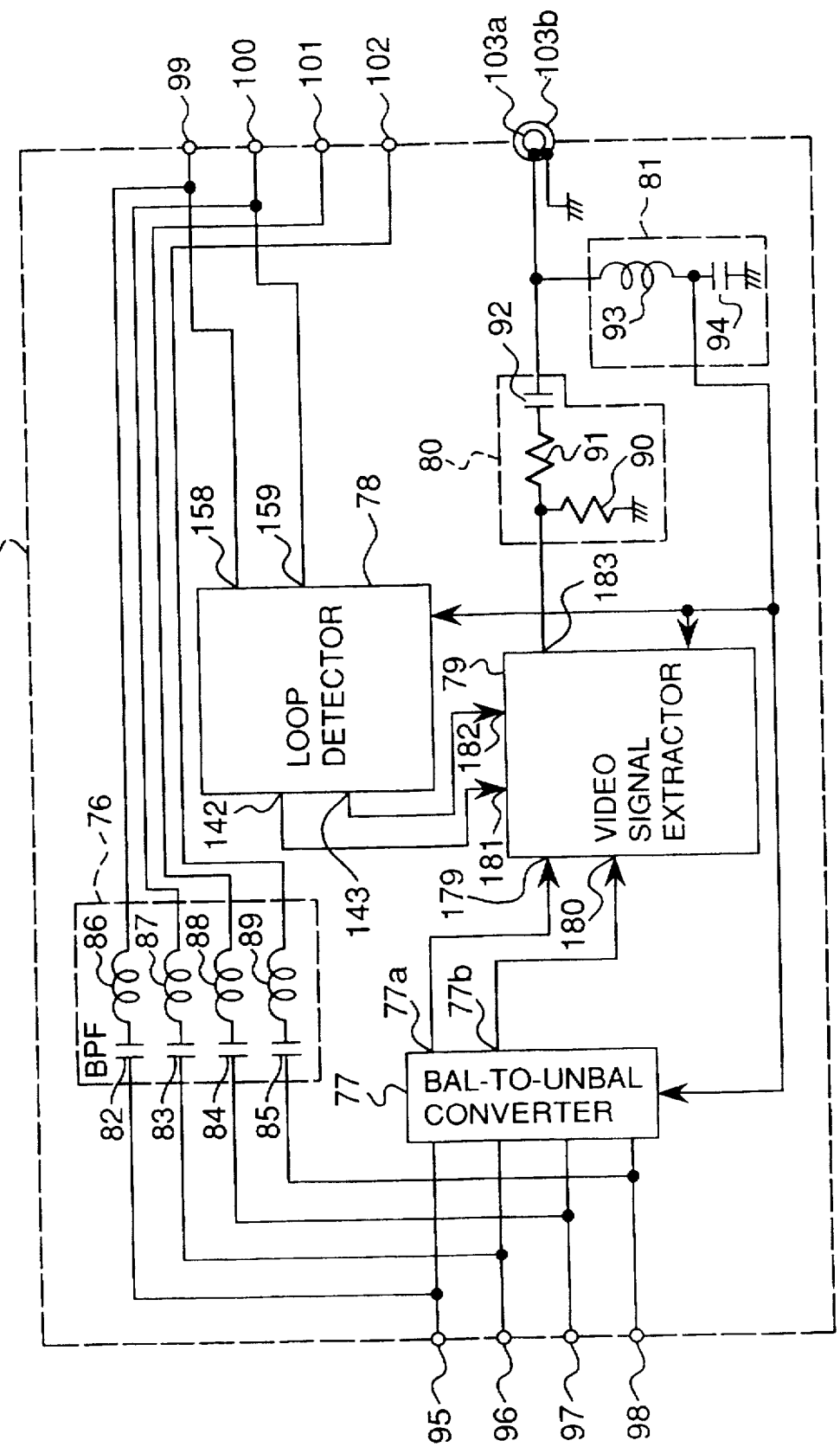
FIG. 6 is a block diagram of a door branching device shown in FIG. 1.

Referring to FIG. 6, a circuit diagram of a door branching device 13 is shown. Terminals 95, 96 and 97, 98 are connected to the two pairs of data lines e1, e2 and e3, e4 in branch line e7, terminals 99, 100 and 101, 102 are connected to the two pairs of data lines f1, f2 and f3, f4 in dedicated audio signal transmission cable f7, and terminals 103a and 103b are connected to the dedicated video signal transmission cables g1, g2, respectively. Note that the dedicated video is signal transmission cables g1, g2 is coaxial cable.

The door branching device 75 comprises a balanced-to-unbalanced convertor 77, a band pass filter 76, video signal extractor 79, loop detector 78, rectifier 80, and power supply 81.

The balanced-to-unbalanced converting receiver 77 receives the video signal at a high input impedance, and balanced-to-unbalanced converts the input signal. The balanced video signal applied to inputs 95 and .96 are converted to unbalanced vide signal and produced from terminal 77a. Similarly, the balanced video signal applied to inputs 97 and 98 are converted to unbalanced vide signal and produced from terminal 77b.

The band pass filter 76 is connected to capacitors 82, 83 and 84, 85 and coils 86, 87 and 88, 89 in series, and passes the audio signals input through terminals 95, 96 and 97, 98, to terminals 99, 100 and 101, 102, respectively.

The video signal extractor 79 extracts the video signal from one of the two video signals at inputs 179 and 180.

The loop detector 78 monitors the DC short-circuited state of terminals 99 and 100 to control video signal output. When the terminals 99 and 100 are open, the video signal received through terminals 97, 98 is transmitted through the video signal extractor 79, and when the terminals 99 and 100 are short-circuited, the video signal received through terminals 95, 96 is transmitted through the video signal extractor 79. In other words, the loop detector 78 is provided to detect which of the two camera-equipped subunits 1 and 2 is operated. The signals applied to terminals 99 and 100 indicate which of the two subunits 1 and 2 is operated. Thus, the loop detector 78 produces signals which can select either one of the two input signals 179 and 180 applied to the video signal extractor.

The resistor 91 provided in the rectifier 80 has an output impedance matched to the characteristic impedance of the dedicated video signal transmission cables g1, g2 (FIG. 1) in the frequency band of the video signal output from the video signal extractor 79. The rectifier 80 comprises a pull-down resistor 90 and capacitor 92. The power supply 81 comprises a coil 93 and capacitor 94, and supplies the DC voltage input from the dedicated video signal transmission cables g1, g2 to the balanced-to-unbalanced convertor 77, loop detector 78, and video signal extractor 79.

Figure 7:
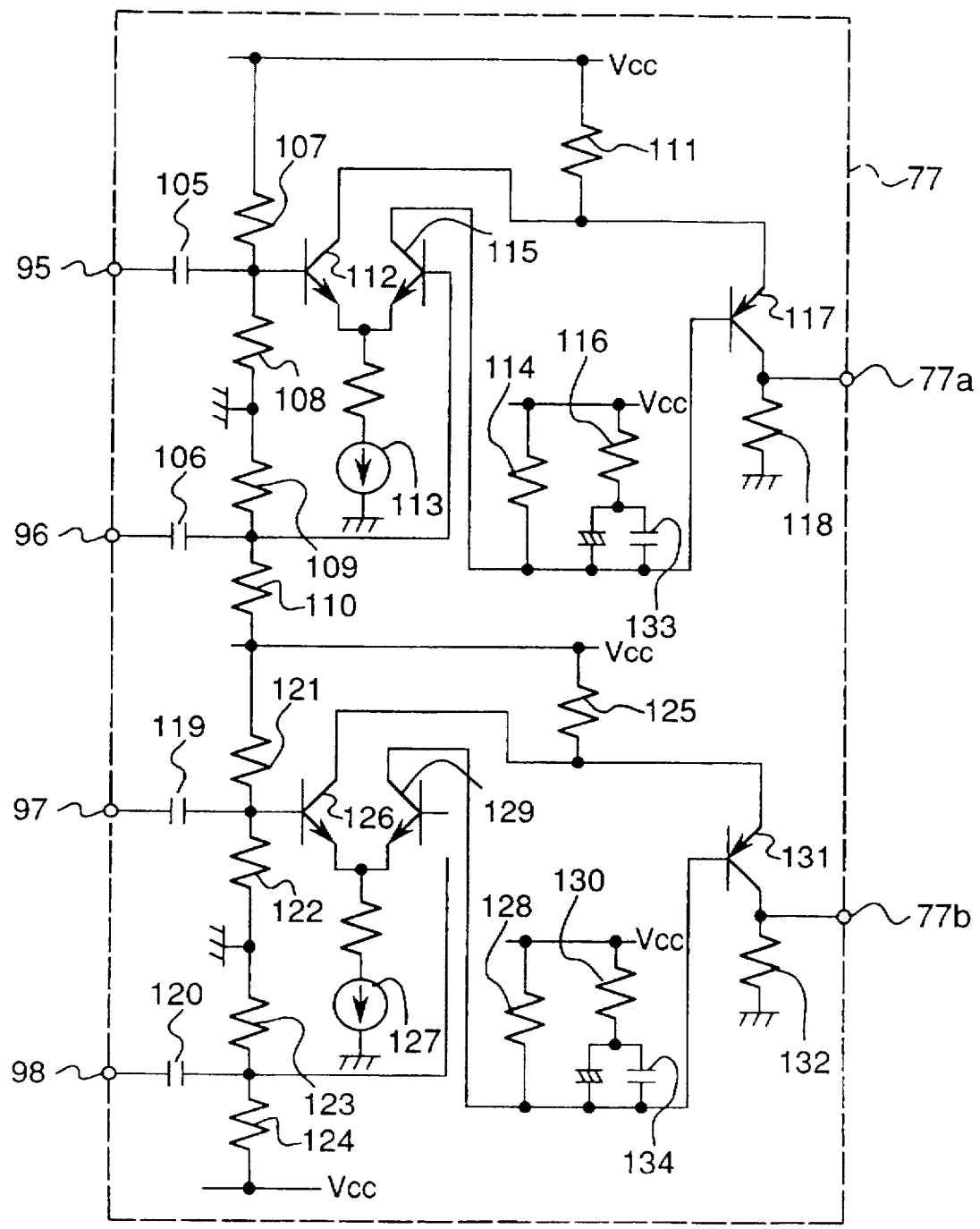
FIG. 7 is a circuit diagram of a balanced-to-unbalanced convertor shown in FIG. 6.

Referring to FIG. 7, a detail of the balanced-to-unbalanced convertor 77 described above is shown. Terminals 95, 96 and 97, 98 are connected to the respective bases of transistors 112, 115, 126, and 129 through capacitors 105, 106 and 119, 120, which have a low impedance in the video signal frequency band and a high impedance in the audio signal frequency band, and high impedance bias resistors 107, 108 and 109, 110, and 121, 122 and 123, 124. Transistors 112 and 115 have their emitters connected through a suitable resistor to a constant current source 113, and transistors 126 and 129 have their emitters connected through a suitable resistor to a constant current source 127. The collector of transistor 112 is connected to resistor 111, and the collector of transistor 126 is connected to resistor 125. The collector of transistor 115 is connected to resistors 114 and also to capacitor 133 and resistor 116. The collector of transistor 129 is connected to resistor 128 and also to capacitor 134 and resistor 130. A transistor 117 is provided which has its base connected to the collector of transistor 115 and its collector to a source resistor 118 and also to terminal 77a. Similarly, a transistor 131 is provided which has its base connected to the collector of transistor 129 and its collector to a source resistor 132 and also to terminal 77b.

The balanced video signals input to terminals 95 and 96 are converted to unbalanced video signal which is produced from terminal 77a. Similarly, the balanced video signals input to terminals 97 and 98 are converted to unbalanced video signal which is produced from terminal 77b.

By the balanced-to-unbalanced convertor 77, a uniform high input impedance is held in the video signal frequency band by the bias resistors 107, 108 and 109, 110, and 121, 122 and 123, 124, and can thus avoid deterioration of transmission quality (of which phase distortion, which is difficult to manage with a transformer, is typical) during video signal transmission.

It is also possible to avoid deterioration of audio signal transmission quality due to a loss of AC impedance because the capacitors 105, 106 can hold a high AC impedance level between terminals 95 and 96, and capacitors 119, 120 can hold a high AC impedance level between terminals 97 and 98 in the audio signal frequency band.

Figure 8:
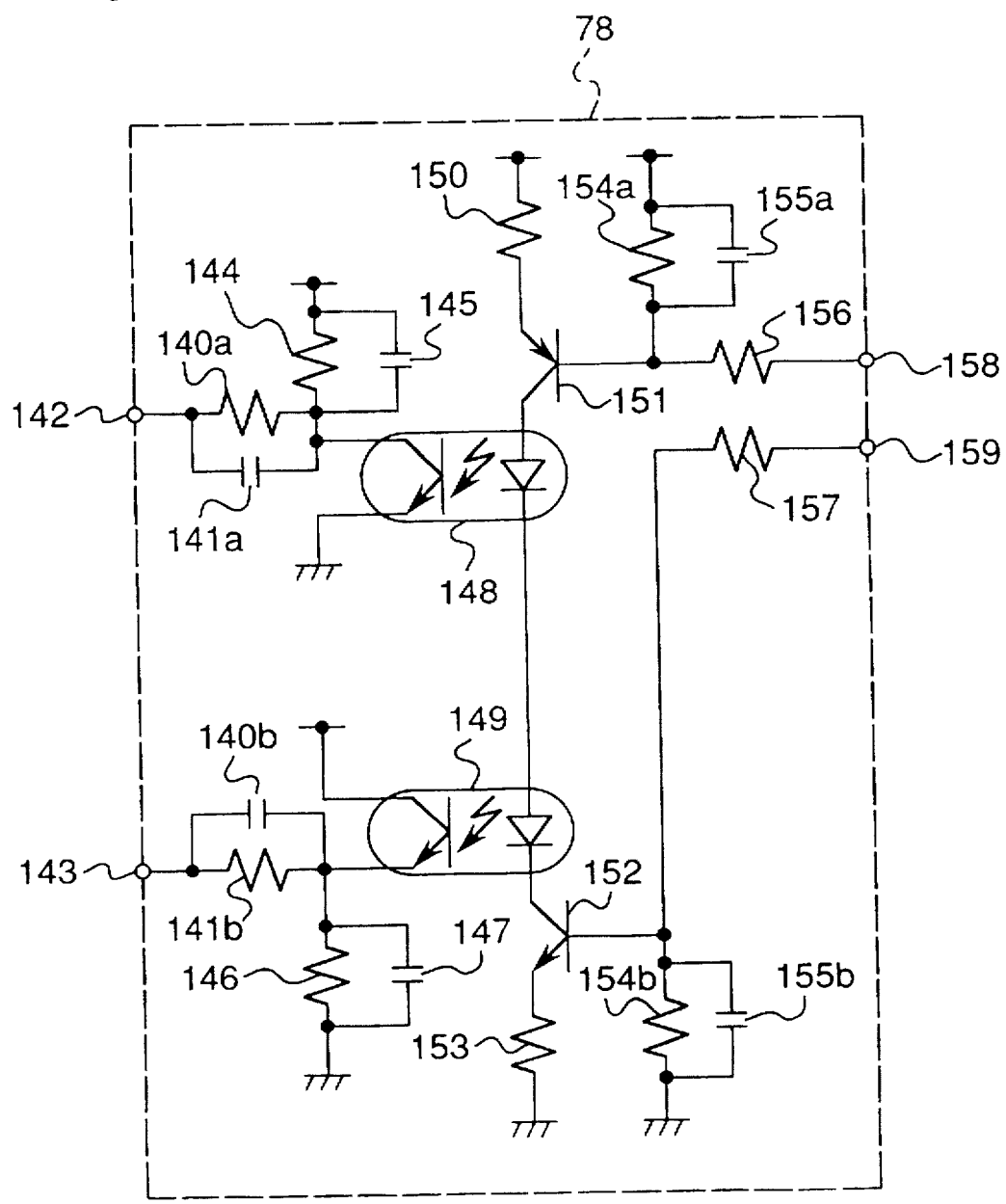
FIG. 8 is a circuit diagram of a loop detector shown in FIG. 6.

Referring to FIG. 8, a detail of the loop detector 78 is shown. The loop detector 78 comprises a transistor 151 having the base connected to terminal 158 through parallel-connected pull-up resistor 154a and capacitor 155a and also through base resistor 156. Transistor 151 also has an emitter resistor 150. A transistor 152 is provided having the base connected to terminal 159 through parallel-connected pull-down resistor 154b and capacitor 155b, and further having a base resistor 157, and an emitter resistor 153.

A photocoupler 148 is provided of which the anode is connected to the collector of transistor 151, and the collector of which is connected to terminal 142 through parallel-connected pull-up resistor 144 and capacitor 145, and parallel-connected collector resistor 140a and capacitor 141a. Another photocoupler 149 is provided of which the cathode is connected to the collector of transistor 152, the anode is connected to the cathode of photocoupler 148, and the collector of which is connected to terminal 143 through parallel-connected pull-down resistor 146 and capacitor 147, and parallel-connected collector resistor 140b and capacitor 141b.

When the terminals 158 (connected to terminal 99) and 159 (connected to terminal 100) are DC open, the collector of photocoupler 148 is open to the ground, and the emitter of the other photocoupler 149 is short-circuited to the ground. When the terminals 158 and 159 are DC closed, the collector of photocoupler 148 is short-circuited to the ground, and the emitter of the other photocoupler 149 rises to the power supply voltage level.

By the loop detector 78, a high impedance level can be held in the audio signal and video signal frequency bands between terminals 99 and 100 by base resistors 156 and 157.

It is also possible to avoid the effects of the audio signal and video signal on the control signal output from terminals 142, 143 by effectively short-circuiting the terminals in the audio signal and video signal frequency bands by capacitors 155a and 155b.

Figure 9:
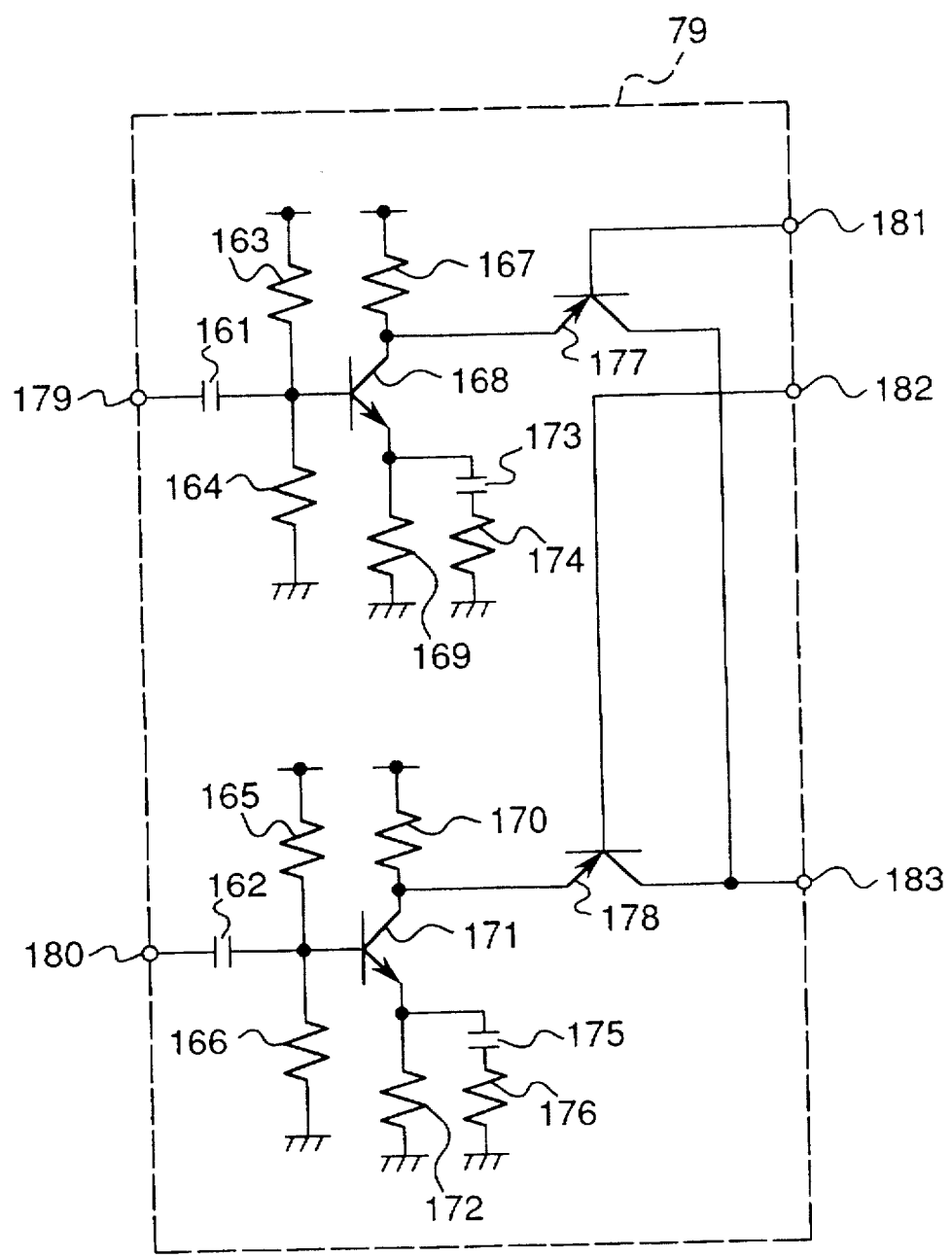
FIG. 9 is a circuit diagram of a video signal extractor shown in FIG. 6.
Figure 10:
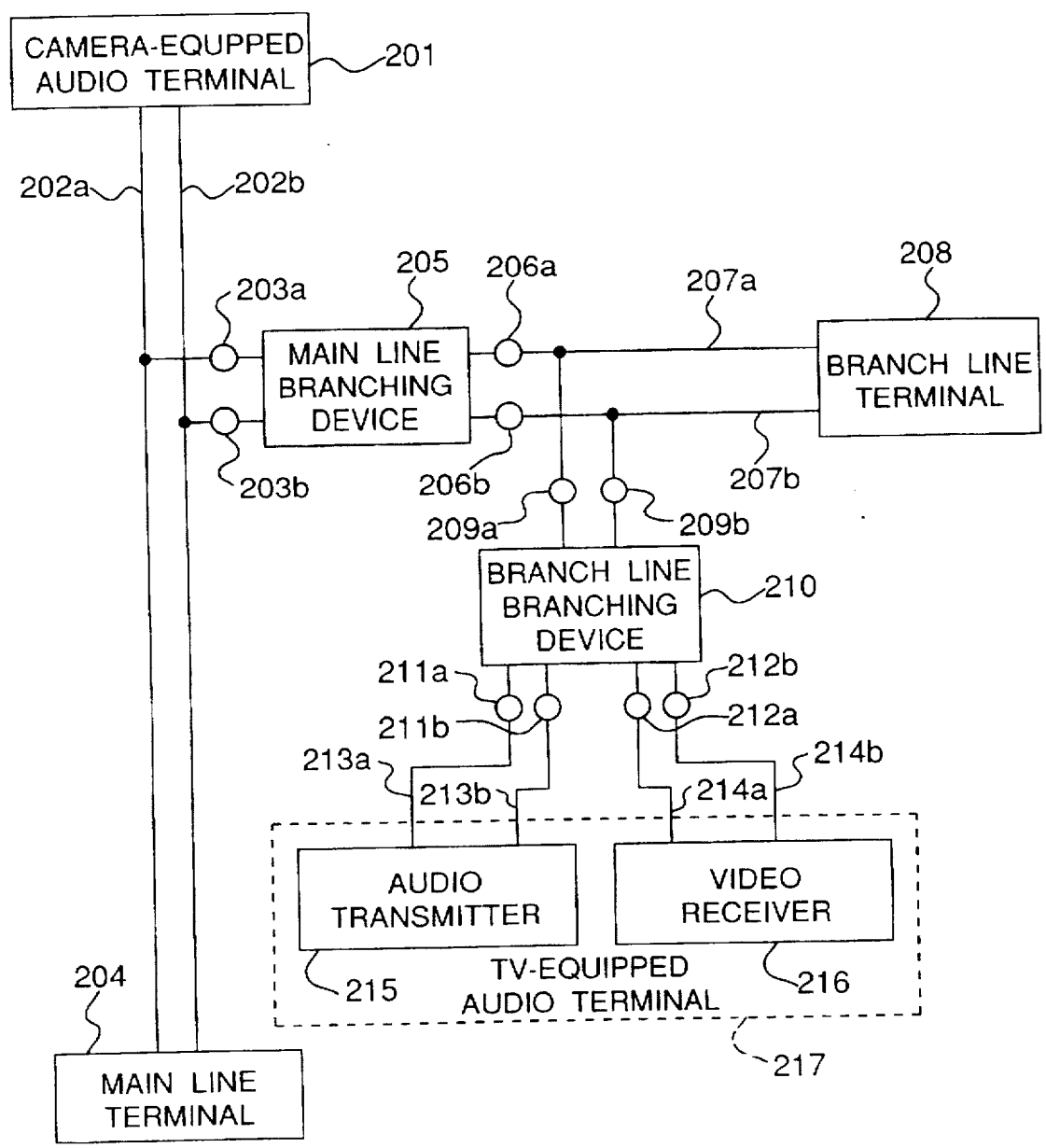
FIG. 10 is a block diagram of a multiplexed audio-video transmission system according to a prior art.
Figure 11:
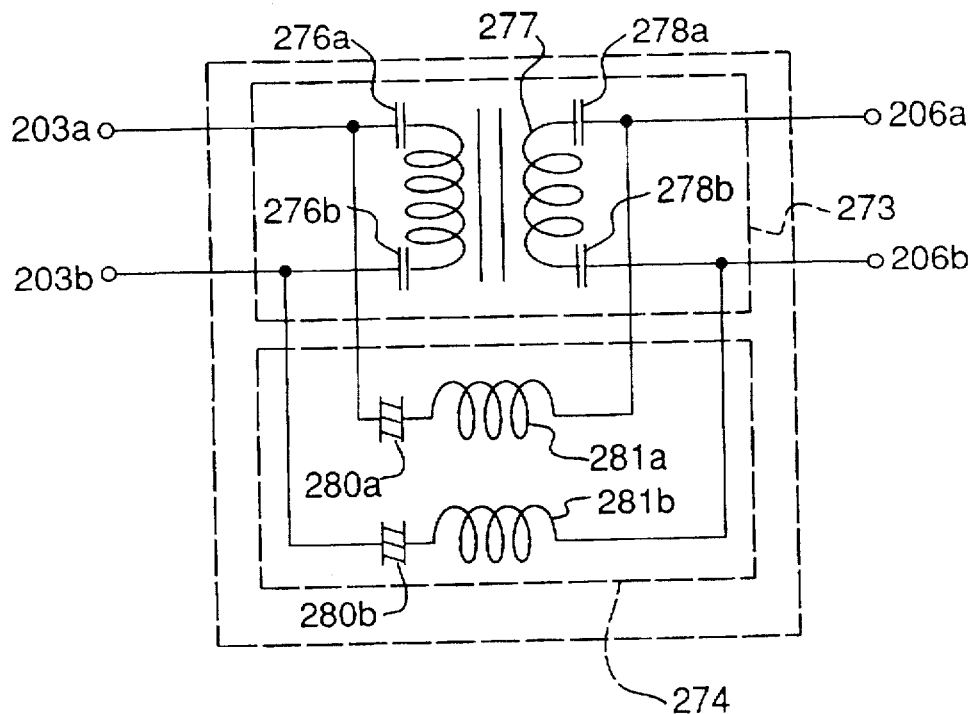
FIG. 11 is a circuit diagram of a prior art main line branching device used in the system of FIG. 10, and having a transformer.
Figure 12:
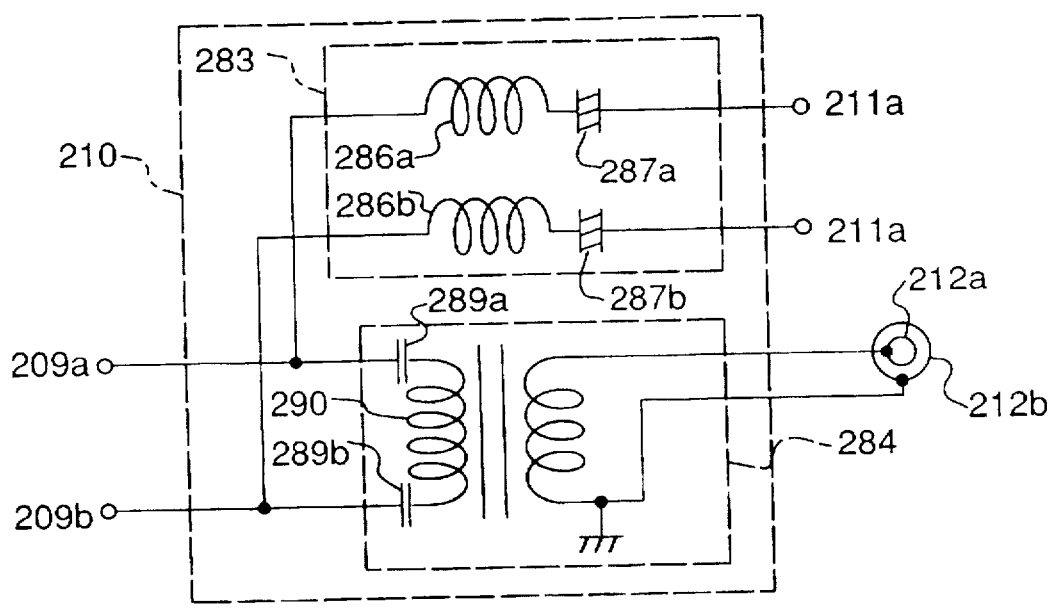
FIG. 12 is a circuit diagram of a prior art door branching device used in the system of FIG. 10, and having a transformer.

Referring to FIG. 9, a detail of the video signal transmitter 79 is shown. The video signal transmitter 79 comprises a transistor 168 with the base connected to terminal 179 through capacitor 161 and bias resistors 163, 164, and comprising a collector resistor 167 and emitter resistor 169; a transistor 171 with the base connected to terminal 180 through capacitor 162 and bias resistors 165, 166, comprising a collector resistor 170 and emitter resistor 172, and having amplification capacitor 175 and amplification resistor 176 connected to the emitter; a switching transistor 177 with the base connected to terminal 181, the emitter connected to the collector of transistor 168, and the collector connected to terminal 183; and another switching transistor 178 with the base connected to terminal 182, the emitter connected to the collector of transistor 171, and the collector connected to terminal 183.

When current flows from terminal 181, the video signal input to terminal 179 is output to terminal 183, and when current flows from terminal 182, the video signal input to terminal 180 is output to terminal 183.

By the video signal transmitter 79, two video signals can be mixed for output to terminal 183 by controlling the voltage of terminals 181 and 182 using the switching transistors 177 and 178.

As described hereinabove, by using the relay and door branching device of the invention in a multiplexed audio-video signal transmission system through a pair-wire, of which the camera-equipped intercom security system is typical, it is possible to provide a multiplexed audio-video signal transmission system such that a uniform, high input impedance characteristic can be maintained in the video signal frequency band; dropping of the transmission signal level when the video signal is passed can be prevented; the cost increase in the overall system can be reduced; the size and weight of the main unit can be reduced; received video signals can be selectively transmitted; and the video signal attenuated through long-distance transmission can be amplified to the specified transmission signal level.

It is to be noted that while the relay of the invention has been described as applied in the multiplexed audio-video signal transmission system, of which the camera-equipped intercom security system is typical, the relay shall not be so limited and can be applied, for example, as a line branching device.

Further note that when the relay of the invention is used as a line branching device, it is not always necessary to provide an automatic gain control device for adjusting the input signal level to the predetermined output signal level.

In addition, while the embodiments of the invention have been described as applied in multiplexed audio-video signal transmission system through pair-wire, of which the camera-equipped intercom security system is typical, the invention shall not be so limited, and can be applied in any paired cable transmission system, including, for example, in a two-way audio transmission system such as a telephone system enabling two parties to converse.

Furthermore, while the embodiments of the invention have been described as applied in multiplexed audio-video signal transmission system through pair-wire, of which the camera-equipped intercom security system is typical, the invention shall not be so limited, and the transmission signals may be any single or plural types of signals.

In addition, while a photocoupler is used in the loop detector of the embodiments, the loop detector shall not be so limited, and any type of optical semiconducting device can be used.

Furthermore, while the circuits have been described using transistors, various other active electronic components, such as FETs, are also possible.

As will be known from the above descriptions of the preferred embodiments, a uniform, high input impedance characteristic can be assured in the frequency band of the input signal, and it is possible to prevent a drop in the transmission signal level when the input signal is passed.

It is also possible to amplify input signals attenuated during transmission to the predetermined transmission signal level by adjusting the degree of amplification.

It is also possible to select from among plural received input signals for transmission.

The present invention can also reduce the cost increase in the overall system, and can reduce the size and weight of the branching devices, relays, and thus the overall system configuration.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A multiplexed audio-video signal transmission system for transmitting a multiplexed audio-video signal and DC power through a wire-pair, in which a video signal modulated to a predetermined frequency band does not overlap a frequency band of an audio signal said audio signal and said video signal being carried in said wire-pair in opposite phase in a balanced condition, and said DC power being carried between said wire-pair, said multiplexed audio-video signal transmission system comprising:

camera-equipped subunit means having a camera, a speaker and a microphone for producing a first balanced audio-video signal;

first wire-pair means connected to said subunit means for transmitting said first balanced audio-video signal;

a relay device connected to said first wire-pair means, said relay device separating a balanced video signal from said first balanced audio-video signal to refine said balanced video signal and for combining said refined balanced video signal with a separated audio signal to produce a second balanced audio-video signal, said relay device comprising:

(i) a balanced-to-imbalanced convertor for converting said separated balanced video signal to an unbalanced video signal;

(ii) an aromatic gain control unit for amplifying said unbalanced video signal;

and (iii) a balanced transmitter for producing an amplified balanced video signal which is a refined version of said balanced video signal;

second wire-pair means connected to said relay device for transmitting said second balanced audio-video signal;

a door branching device connected to said second wire-pair means for receiving said second balanced audio-video signal and for separating said audio signal and said video signal; and a television-equipped control unit connected to said door branching device for viewing an image captured by said camera using said video signal and for effecting a two-way communication with said camera-equipped subunit means using said audio signal.

2. The multiplexed audio-video transmission system of claim 1, wherein an automatic gain control device adjusts an input AC signal to a predetermined transmission signal level and outputs a level-adjusted signal, said automatic gain control device comprising:

a half-wave rectification circuit that half-wave rectifies and smooths said input AC signal and produces a bias voltage;

a differential amplification circuit that multiplies said bias voltage to produce an adjustment DC voltage; and an amplification adjustment circuit that amplifies said input AC signal by said adjustment DC voltage, so as to output a signal with a predetermined amplitude.

3. The multiplexed audio-video transmission system of claim 2, wherein said half-wave rectification circuit comprises an amplifier that amplifies said input AC signal by a predetermined amplification degree to produce an amplified AC signal;

a predetermined bias voltage generator that generates a predetermined bias voltage; and a rectifier that rectifies and smooths said amplified AC signal to produce said bias voltage.

4. The multiplexed audio-video transmission system of claim 2, wherein said differential amplification circuit comprises a constant current source.

5. The multiplexed audio-video transmission system of claim 2, wherein said amplification adjustment circuit comprises an active electronic component.

6. The multiplexed audio-video transmission system of claim 5, wherein said active electronic component comprises a double gate FET.

7. A multiplexed audio-video signal transmission system for transmitting a multiplexed audio signal video signal and electrical power through a wire-pair, in which a video signal modulated to a predetermined frequency band does not overlap a frequency band of an audio signal, said audio signal and said video signal being carried in said wire-pair in opposite phase in a balanced condition, and said electrical power being carried between said wire-pair, said multiplexed audio-video signal transmission system comprising:

- camera-equipped subunit means having a camera, a speaker and a microphone for producing a first balanced audio-video signal;
- first wire-pair means connected to said subunit means for transmitting said first balanced audio-video signal;
- a relay device connected to said first wire-pair means, said relay device separating a balanced video signal from said first balanced audio-video signal to refine said balanced video signal and for combining said refined balanced video signal with a separated audio signal to produce a second balanced audio-video signal, said relay device comprising:
  (i) a balanced-to-unbalanced converter that converts said separated balanced video signal to an unbalanced video signal;
  (ii) an automatic gain control unit that amplifies said unbalanced video signal; and
  (iii) a balanced transmitter that produces an amplified balanced video signal which is a refined version of said balanced video signal;
- second wire-pair means connected to said relay device for transmitting said second balanced audio-video signal;
- a line branching device connected to said second wire-pair means that receives and refines said second balanced audio-video signal and for producing a third balanced audio-video signal;
- third wire-pair means connected to said branching device for transmitting said third balanced audio-video signal;
- a door branching device connected to said third wire-pair means for receiving said third balanced audio-video signal and for separating said audio signal and said video signal; and
- a television-equipped control unit connected to said door branching device for viewing an image captured by said camera using said video signal and for effecting a two-way communication with said camera-equipped subunit means using said audio signal.

8. The multiplexed audio-video signal transmission system of claim 7, wherein said line branching device comprises:

- a transformer-less balanced receiver comprising a first transistor and a second transistor; and
- a transformer-less balanced transmitter comprising a third transistor and a fourth transistor.

9. The multiplexed audio-video signal transmission system of claim 7, wherein said door branching device comprises:

- a balanced-to-unbalanced converting receiver that receives and converts said third balanced audio-video signal to an unbalanced audio-video signal; and
- a video signal extractor that extracts said video signal from said unbalanced audio-video signal.

10. The multiplexed audio-video signal transmission system of claim 2, wherein said automatic gain control device comprises:

- a rectification unit that half-wave rectifies and smooths an amplified input AC signal to produce a DC voltage related to an attenuated signal level of said input AC signal;
- a differential amplifier unit that multiplies said DC voltage to produce an adjustment DC voltage; and
- an amplification adjustment unit that amplifies said input AC signal by said adjustment DC voltage, so as to output a signal with a predetermined amplitude.

11. The multiplexed audio-video signal transmission system of claim 10, wherein said amplification adjustment unit comprises a field effect transistor.

12. The multiplexed audio-video signal transmission system of claim 10, wherein said rectification unit includes an amplifier that amplifies an input AC signal to produce said amplified input AC signal.

13. A balanced-to-unbalanced converter used in a system for transmitting through a wire-pair a multiplexed audio signal, a video signal modulated to a frequency band that does not overlap an audio signal frequency, and electrical power, said audio signal and said video signal being carried in said wire-pair in an opposite phase in a balanced condition, and said electrical power being carried between said wire-pair, said balanced-to-unbalanced converter, comprising:

- a balanced receiver having an impedance matching element to present an impedance equal to said wire-pair at said video signal frequency band for blocking said electrical power and said audio signal, and for passing said video signal; and
- an unbalanced transmitter for removing same-phase signal components from said balanced video signal, applying a balanced-to-unbalanced signal conversion, and producing said unbalanced signal.

14. The balanced-to-unbalanced converter of claim 13, wherein said balanced receiver comprises:

- first and second active electronic components having equal characteristics and performance connected through first and second capacitors, respectively, for passing said video signal and blocking said electrical power and audio signal; and
- an impedance matching element having an output impedance equal to said wire-pair at the video signal frequency band.

15. The balanced-to-unbalanced converter of claim 13, wherein said unbalanced transmitter comprises:

- an active electronic component;
- a first resistor device; and
- a second resistor device having an input impedance equal to said first resistor devices whereby said balanced video signals produced from said first and second active electronic components are converted to unbalanced video signal.

16. A relay device used with a wire-pair for transmitting a multiplexed audio signal, a video signal modulated to a frequency band that does not overlap an audio signal frequency, and an electrical current, said audio signal and said video signal being carried by said wire-pair, in opposite phase in a balanced condition, said electrical current being carried between said wire-pair, said relay device comprising:

I. a balanced-to-unbalanced converter, comprising:
  (i) a balanced receiver having an impedance matching element to present an impedance equal to said wire-pair at said video signal frequency band, said impedance matching element blocking said electrical current and said audio signal while passing said balanced video signal; and
  (ii) an unbalanced transmitter that removes same-phase signal components from said balanced video signal, applies a balanced-to-unbalanced signal conversion, and produces an unbalanced video signal;

II. an automatic gain control device that adjusts a gain of said unbalanced video signal to a predetermined transmission signal level and outputs a level-adjusted signal, said automatic gain control unit comprising:
  (i) a half-wave rectification circuit that half-wave rectifies and smooths said unbalanced video signal and produces a bias voltage;
  (ii) a differential amplification circuit that multiplies said bias voltage to produce an adjustment DC voltage; and
  (iii) an amplification adjustment circuit that amplifies said unbalanced video signal by said adjustment DC voltage;

III. a balanced transmitter that converts said amplified unbalanced video signal to a refined and balanced video signal;

IV. a low pass filter comprising a coil, said coil being connected in parallel to a series connection of said balanced-to-unbalanced converter, said automatic gain control device, and said balanced transmitter for blocking said video signal and bidirectionally transmitting said audio signal and said DC current, and V. a power supply unit that receives said electrical current from said wire-pair and generates a predetermined voltage which is supplied to said balanced-to-unbalanced converter, said automatic gain control device, and said balanced transmitter.

17. The relay device of claim 16, wherein said balanced receiver comprises:

first and second active electronic components having equal characteristics and performance connected through first and second capacitors, respectively, that pass said video signal and block said electrical current and said audio signal; and an impedance matching element having an impedance equal to said wire-pair at said video signal frequency band.

18. The relay device of claim 16, wherein said unbalanced transmitter comprises:

an active electronic component having an input impedance in which said balanced video signal produced from said first and second active electronic component are converted to said unbalanced video signal.

19. The relay device of claim 16, wherein said half-wave rectification circuit comprises an amplifier that amplifies said unbalanced video signal by a predetermined amplification degree to produce an amplified unbalanced video signal;

a predetermined bias voltage generator that generates a predetermined bias voltage; and a rectifier that rectifies and smooths said amplified unbalanced video signal to produce said bias voltage.

20. The relay device of claim 16, wherein said differential amplification circuit comprises a constant current source.

21. The relay device of claim 16, wherein said amplification adjustment circuit comprises an active electronic component.

22. The relay device of claim 21, wherein said active electronic component comprises a double gate FET.

* * * * *

UNITED STATES PATENT AND TRADEMARK OFFICE
CERTIFICATE OF CORRECTION

PATENT NO. : 5,778,303
DATED : July 7, 1998
INVENTOR(S) : N. SHINOZAKI et al.

It is certified that error appears in the above-indentified patent and that said Letters Patent is hereby corrected as shown below:

At column 14, line 23 (claim 1, line 22) of the printed patent, change "balanced-to-imbalanced" to ---balanced-to-unbalanced---.

Signed and Sealed this

Thirtieth Day of May, 2000

Attest:

Q. TODD DICKINSON

Attesting Officer

Director of Patents and Trademarks